United States Patent [19]

Pope

[11] 3,743,303

[45] July 3, 1973

[54] FORCE BALANCED SPLIT RING DYNAMIC SHAFT SEALS

[75] Inventor: Adam N. Pope, Cincinnati, Ohio

[73] Assignee: General Electric Company, Cincinnati, Ohio

[22] Filed: Dec. 29, 1970

[21] Appl. No.: 102,440

[52] U.S. Cl. .................... 277/27, 277/75, 277/173
[51] Int. Cl. ............................................. F16j 15/16
[58] Field of Search ................... 277/3, 27, 74, 75, 277/173

[56] References Cited

UNITED STATES PATENTS

| | | | |
|---|---|---|---|
| 2,916,332 | 12/1959 | Pavlecka | 277/53 X |
| 3,606,349 | 9/1971 | Petrie et al. | 277/27 |
| 3,315,968 | 4/1967 | Hanlon | 277/3 |
| 2,563,971 | 8/1951 | Stein | 277/75 |
| 2,921,805 | 1/1960 | Shevchenko | 277/74 X |
| 3,386,346 | 6/1968 | Halpin | 277/173 X |
| 3,377,073 | 4/1968 | Harney | 277/27 |
| 3,544,118 | 12/1970 | Klein | 277/27 |

*Primary Examiner*—Meyer Perlin
*Assistant Examiner*—Ronald C. Capossela
*Attorney*—Derek P. Lawrence, Thomas J. Bird, Jr., Lee H. Sachs, Frank L. Neuhauser, Oscar B. Waddell and Joseph B. Forman

[57] ABSTRACT

A dynamic shaft seal assembly of the piston ring type includes means for generating servoforces at the seal interfaces to reduce rubbing loads and wear. The servoforces are generated by venting the bottom of a groove which supports the seal ring and by providing passageways through the seal ring to pressurize the low pressure face and the outer face thereof. The forces thus generated vary in response to changes in the dimension of the gap between the seal ring and the seal seats with the overall axial forces tending to center the seal ring in the groove. Leakage is controlled primarily by varying the dimension of a radial passageway formed between the high pressure face of the seal ring and one of the axial seats.

17 Claims, 11 Drawing Figures

PATENTED JUL 3 1973 3,743,303

INVENTOR.
ADAM N. POPE

T. J. Bird, Jr.
AGENT

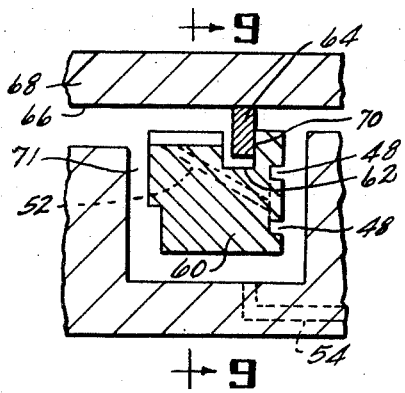
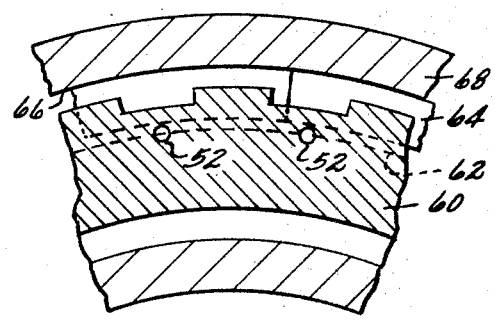
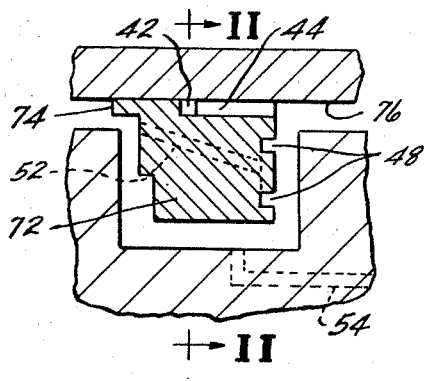
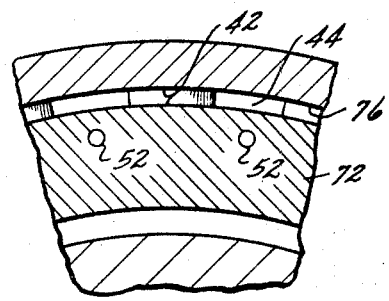
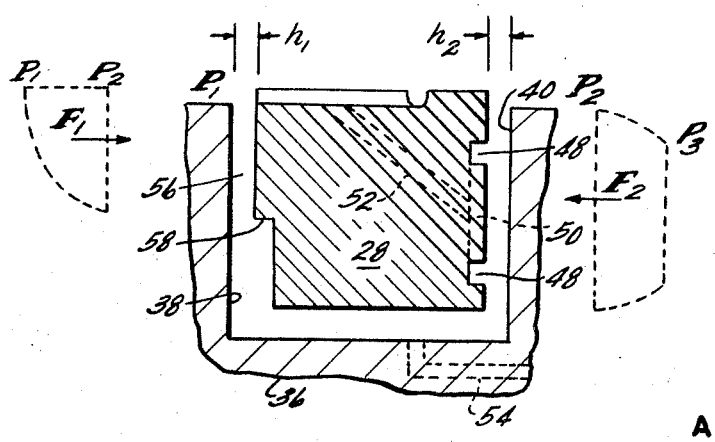
WHEN $h_1 = 0$, $P_3 = P_2$
WHEN $h_2 = 0$, $P_3 = P_1$
INVENTOR.
ADAM N. POPE 3,743,303

FORCE BALANCED SPLIT RING DYNAMIC SHAFT SEALS

BACKGROUND OF THE INVENTION

This invention relates generally to the field of dynamic shaft seals for separating high and low pressure liquids and/or gases. More particularly, this invention relates to improvements in piston ring type dynamic shaft seals.

Th problem of separating liquids (such as oil) from gases arises in almost every apparatus having rotating components which require lubrication. In many apparatus, such as gas turbine engines, the problem is complicated in that (1) the components are rotating at extremely high speeds and (2) large pressure differentials are generated across the sealing elements. In apparatus such as gas turbine engines, rotational speeds of 30,000 rpm or higher and pressure differentials across sealing elements of hundreds of psi are quite common. When the sealing elements are used to maintain a supply of lubricant for the engine, the failure of such an element can result in costly shutdown and repair procedures.

Furthermore, in certain applications, the sealing elements are at times subjected to extremely high temperatures. Even if the sealing element itself is not subjected to these temperatures, the rotating components are subjected to high temperatures; and the resultant thermal growth may cause relative movement between the sealing elements and the rotating components. This increases the problems associated with the sealing elements.

In many simplified apparatus involving rotating components, simple, reliable and cheap carbon ring type seals may be used. In more sophisticated apparatus such as gas turbine engines, however, the problems described above normally preclude the use of such seals. In such apparatus, therefore, sealing elements have become more and more sophisticated. As they have become more sophisticated, they have also become more and more complicated and costly.

SUMMARY OF THE INVENTION

It is an object of the present invention, therefore, to provide a piston ring type seal which is capable of use in high speed, temperature, and pressure applications.

It is a further object of this invention to provide such a seal in which the forces on opposing sides thereof are balanced to reduce wearing loads thereon and thereby increase seal life.

Briefly stated, the above objects are attained by providing a piston ring type dynamic seal which is positioned within a groove formed in a seal housing and which includes means for generating a servoforce in one or more of the pressure bearing faces thereof. The servoforce generating means are adapted to provide variable forces as the gap between the seal ring face and the seal seat varies. In this manner, counterbalancing forces are generated which tend to center the seal ring within the groove and thereby prevent or reduce rubbing loads between the seal faces and the seal seats.

DESCRIPTION OF THE DRAWINGS

While the specification concludes with a series of claims which particularly point out and distinctly claim the subject matter which Applicant regards as his invention, a complete understanding of the invention will be gained from a reading of the following description of preferred embodiments thereof. This description is given in connection with the drawings, in which:

FIG. 7 is a simplified force diagram of the forces on the seal assembly of FIG. 3;

FIG. 8 is a sectional side view, with portions removed, of an alternative sealing element;

FIG. 9 is a sectional view taken along line 9—9 of FIG. 7;

FIG. 10 is a sectional side view, with portions removed, of an alternative sealing element; and FIG. 11 is a sectional view taken along line 11—11 of FIG. 9.

DESCRIPTION OF PREFERRED EMBODIMENTS

Figure 1:
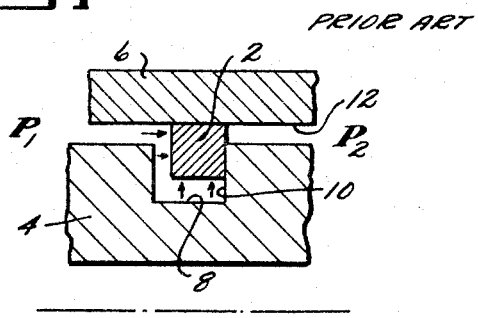
FIG. 1 is a sectional side view, with portions removed, of a prior art carbon piston ring sealing element.

Referring now to the drawings wherein like numerals correspond to like elements throughout, reference is initially made to FIG. 1 wherein a plain carbon piston ring 2 is used as an air/oil seal between two rotating shafts 4 and 6. The seal ring 2 is positioned in a groove 8 on the inner shaft 4 and centrifugal force seats the ring 2 against the outer shaft 6. As shown in FIG. 1, the seal ring 2 is subjected to a high pressure P1 on one side thereof and a low pressure P2 on the opposite side thereof. The pressure drop across the seal ring 2 imposes an increased radial force thereon and also generates an axial force, as shown by the small arrows in the figure. As this pressure drop increases, the seal force imposed seats the seal ring 2 against a low pressure face 10 of the seal axial seat formed by the groove 8. The combined centrifugal and pressure forces on the seal ring 2 cause high rubbing loads to occur on the right hand face of the seal ring 2. In addition, when relative axial motion occurs between the rotating shaft 4 and rotating shaft 6, the sealing ring 2 is forced to slide in an axial direction on an internal surface 12 of the outer shaft 6. This sliding motion, however, is opposed by the centrifugal and pressure forces exerted on the seal ring 2. This can result in even higher rubbing loads between the right hand face of the ring 2 and the low pressure face 10 of the groove 8. These high rubbing loads cause a high rate of wear which results in increased leakage rates and limited seal life.

Figure 2:
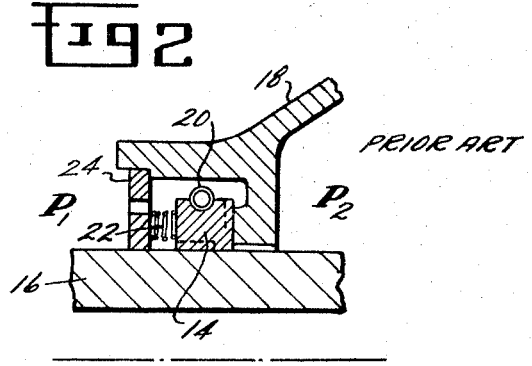
FIG. 2 is a sectional side view, with portions removed, of a prior art circumferential carbon seal.

Referring now to FIG. 2, a typical prior art circumferential carbon seal is shown to include a circumferential carbon ring 14 which surrounds a rotating shaft 16 and is held in place by a stationary or rotating housing 18. The carbon ring 14 is held in place by means of a circumferential spring 20 which fits within a groove in the outer face of the carbon ring 14. The ring 14 is further positioned by means of a second spring 22, which is positioned between the ring 14 and a retainer member 24, and which forces the ring 14 against the housing 18. The pressure drop across the sealing element of this type of seal is limited in order to achieve a sufficient wear life because rubbing loads increase as pressure drop across the seal increases. Thus, where the pressure drop from P1 to P2 is high, the life of the carbon ring 14 in this type of seal is limited.

Figure 3:
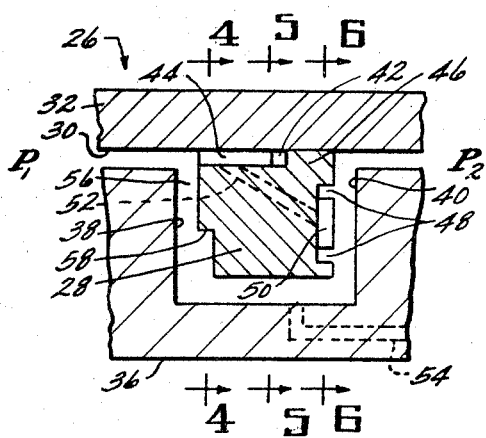
FIG. 3 is a sectional side view, with portions removed, of a piston ring sealing element constructed in accordance with this invention.

Referring now to FIG. 3, a force balanced piston ring type dynamic shaft seal constructed in accordance with the present invention is pictured and generally labeled with the numeral 26. As will become apparent from the following discussion, the shaft seal 26 will be capable of use in virtually any application wherein a pressure drop occurs across the seal. The following described applications are therefore intended to be merely illustrative of the many possible uses. As shown, the shaft seal 26 comprises a seal ring 28, which is captured under a seal radial seat 30, which in the present case comprises the inner bore of a rotating shaft 32. The shaft seal ring 28 is positioned within a groove formed within a rotating shaft 36 in a manner to provide axial seats 38 and 40 for the ring 28. (While the shaft 36 is shown as a single member, it should be obvious that in many applications the shaft 36 would comprise two or more members suitably interconnected for easy assembly.) Pressure drop across the seal is presumed to be from left to right as shown in FIG. 3, i.e., high pressure is labeled P1 and low pressure is labeled P2.

In the present case, the seal ring 28 is held against the seal radial seat 30 by centrifugal force due to the rotation of the shaft 32. As will become apparent from the complete description of the present invention, however, the seal ring 28 is also ideally suited for use between a rotating and a stationary shaft. In such a case, the seal ring 28 would be held against the seal radial seat 30 by inherent spring force in the seal ring itself or by pressure force exerted by the stationary shaft. Of course, the seal ring 28 could be held in position by any combination of centrifugal, pressure or inherent spring force as dictated by design requirements and/or operating conditions.

Figure 4:
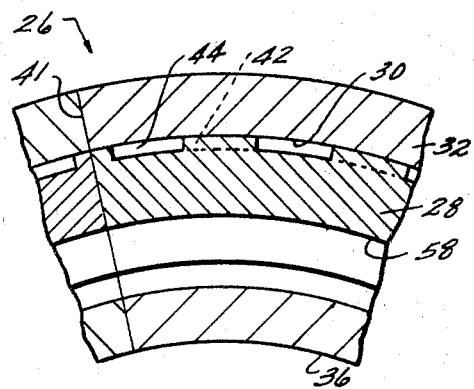
FIG. 4 is a sectional view taken along line 4—4 of FIG. 3.
Figure 5:
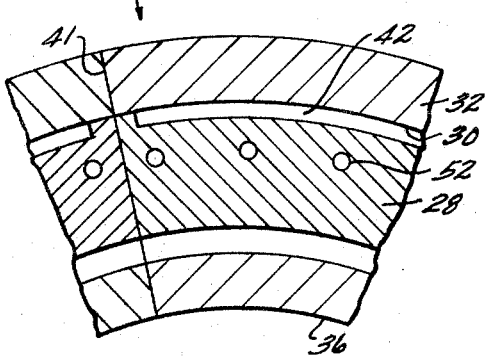
FIG. 5 is a sectional view taken along line 5—5 of FIG. 3.
Figure 6:
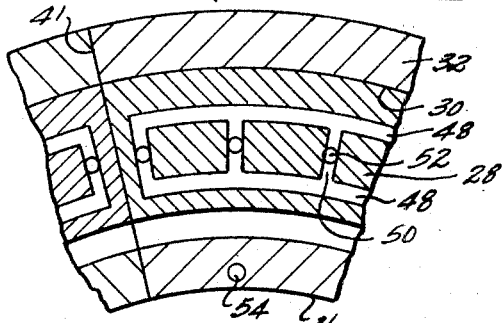
FIG. 6 is a sectional view taken along line 6—6 of FIG. 3.

The seal ring 28 is not a continuous ring in that it contains at least one gap 41, as shown in FIGS. 4 through 6, to allow for radial growth of the seal radial seat 30. As shown in FIGS. 3 through 5, the seal ring 28 is provided with an annular groove 42 which extends around the entire outer perimeter thereof, but is sealed at the gap 41 to prevent leakage from the gap to the grooves. For a reason to be presently described, the annular groove 42 is connected to the high pressure side of the seal by means of a plurality of vent passageways 44, which consist of slots machined in the outer surface of the seal ring 28. The high pressure gas or liquid is sealed from the low pressure side by means of a narrow dam 46 located at the low pressure side of the seal ring 28. As further shown in FIGS. 3 and 6, the low pressure face of the seal ring 28 includes one or more circumferential grooves 48 which are interconnected by means of one or more radial grooves 50. The grooves 48 are also connected to the high pressure side of the seal 26 by means of a plurality of orifices 52 which extend from the passageways 44 to the grooves 48. The grooves 48 are also sealed at the gap 41 to prevent leakage thereto.

Operation of the seal 26 will now be described with the following assumptions being made: the shaft 32 is rotating at a higher speed than the shaft 36, and the centrifugal or inherent forces in the ring 28 are sufficient to cause the ring 28 to rotate with the shaft 32. (Operation of the seal 26 would be very similar to the following even if these assumptions were not true). Operation will be discussed in connection with FIG. 7 wherein a simplified force diagram shows the forces acting on the seal ring 28 in the axial direction. Radial forces have not been shown in order to simplify the drawing.

Speaking briefly of these radial forces, high pressure air ($P_1$) pressurizes the annular groove 42 and the vent passageways 44 in the outer face of the seal ring 28; while the area under the seal ring 28 is vented through holes 54 in the shaft 36 to a low pressure ($P_2$). Since high pressure exists on the outer face of the seal ring 28 and low pressure exists on the inside diameter thereof, a net radially inward force is imposed on the ring 28 if only these pressure forces are considered. The magnitude and direction of this net radial force can be varied as required by increasing the width of the sealing dam 46 on the outside diameter of the sealing ring 28, by increasing or decreasing the axial clearance between the seal ring 28 and the axial seat 38, by changing the area of the vent passageways 44, or by moving the dam 46 axially.

Referring now to the axial forces, air (or liquid) enters an axial clearance ($h_1$) between the axial seat 38 and the seal ring 28 at a high pressure ($P_1$). This axial clearance forms a flow restriction or passageway 56 in which th pressure decreases as the gas flows radially inwardly until it reaches a cut 58 in the ring 28, at which point the gas expands to the pressure of the low pressure side ($P_2$) of the seal 26. The net effect of this flow is a force $F_1$ which is exerted on the high pressure face of the seal ring 28.

As previously mentioned, the high pressure air is also routed to the low pressure face of the seal ring 28 by means of the orifices 52. The circumferential grooves 48 are thus capable of being pressurized to a level equal to that of the high pressure side of the seal. Each of the grooves 48 is positioned at a radial height which falls below the outer diameter of the shaft 36 when the maximum amount of expansion of the ring 28 is taken into consideration. In this manner, when the axial clearance ($h_2$) between the seal ring 28 and the seal axial seat 40 is zero, no air flows through the orifices 52, and the pressure in the circumferential grooves 48 is equal to the pressure of the high pressure side of the seal assembly or as shown in FIG. 7, $P_3$ equals $P_1$. In other words, the gap $h_2$ is the primary restriction in the flow path from the high pressure side to the low pressure side of the field, and little or no pressure drop occurs across the orifices 52. This pressure generates a force $F_2$ which relieves or eliminates rubbing loads at the interface between the low pressure face of the ring 28 and the axial seat 40. By properly designing the total area of the grooves 48 and the area of the high pressure face of the seal ring 28, one can vary the forces $F_1$ and $F_2$ and thus vary the net axial force on the seal ring 28. The area of the high pressure face can be changed by moving the position of the cut 58, which cut also determines the radial length of the passageway 56.

If, as a result of this net force, the clearance ($h_1$) between the seal ring 28 and the left hand axial seat 38 approaches zero, thereby closing down the passageway 56, the clearance ($h_2$) between the low pressure face and the axial seat 40 will necessarily increase. Air flow through the orifices 52 would then approach a choked flow condition, i.e., the orifices 52 become the major restrictions in the flow path, and pressure in the circumferential grooves 48 would decrease. This, in turn, would generate a net force to the right on the seal ring 28 to oppose the above-mentioned force and to relieve or eliminate rubbing between the axial seat 38 and the seal ring 28. Thus, the net axial force on the seal ring 28 depends upon the position of the ring 28 within the groove 8, with the overall forces tending to center the seal ring 28 within the groove 8. Because the pressure drop ($P_1$ to $P_2$) throughout the passageway 56 remains relatively constant with axial movement of the ring 28, while the pressure drop ($P_3$ to $P_2$) from the grooves 48 varies as the clearance ($h_2$) changes, the right hand (low pressure face) area is normally designed to be approximately twice that of the high pressure face to assure that a force to the left, as seen in FIG. 3, is exerted on the seal ring 28 during all operating conditions.

In addition to eliminating or reducing axial forces, if a rub should occur at the interface of the seal ring 28 and the radial seat 30 because of relative thermal movement between the shafts 32 and 36, the ring 28 is relatively free to slide axially in the groove 8 because of the net radial pressure forces described above. In this manner, the interface rubbing loads on all three wear surfaces of the seal ring 28 are light enough to prevent the high wear rates associated with rings such as those shown in FIGS. 1 and 2.

Air, or liquid, leakage through the seal 26 is controlled primarily by the size of the clearance ($h_1$) at the interface of the seal ring 28 and the axial seat 38. This leakage rate may be adjusted by varying the clearance and/or the length of the passage 56, as previously described.

Should the design considerations be such that a great amount of relative movement between the shaft 32 and the shaft 36 will occur, the annular groove 42 could be replaced by a radial servo in the outer face of the shaft seal ring 28. This servo could be similar to the one in the low pressure face shown in FIG. 3, or it could be a stepped or tapered servo. In such a case the servo would provide a reduction in radially inward pressure forces on seal ring 28 as the clearance between the ring 28 and the radial seat 30 becomes greater than zero. One particular advantage of this type of design would be the prevention of a large clearance and a resulting high leakage rate between the ring 28 and the radial seat 30 at conditions wherein the radial inward pressure forces at zero radial clearance exceed the radial outward forces.

One of many possible alternative embodiments of the seal 26 is shown in FIGS. 8 and 9. As shown, the split seal ring 28 is replaced by a solid seal ring 60 which contains a small groove 62 in its outer face. In this embodiment, the narrow dam 46 of FIG. 3 is replaced with a small split ring 64, which is positioned within the groove 62. The split ring 64 is pressure seated radially against a radial seat 66, which is formed by the internal bore of a shaft 68, to prevent flow between the sealing element and the radial seat. The split ring 64 is also pressure seated axially against a face 70 of the groove 62 in the solid ring 60. A radial clearance is provided between the solid ring 60 and the radial seat 66 to allow relative expansion and contraction of these two pieces without interference.

The axial servoforces on the solid ring 60 are provided in a manner identical to that shown and discussed with reference to FIGS. 3 through 6. In light of this, the high pressure face of the ring 60 forms a flow restriction 71, the length of which is controlled by cutting the high pressure face as described above. The low pressure face of the ring 60 is again provided with the circumferential grooves 48 which are connected to the high pressure side by means of the orifices 52. To assure that the split ring 64 would rotate with the solid ring 60, and thus to prevent wear along the interface of the split ring 64 and the face 70 of the groove 62, the split ring 64 could be keyed into the solid ring 60. The bottom side of the solid ring 60 would again be maintained at the low pressure by means of the vent holes 54.

The combination solid-split ring seal shown in FIGS. 8 and 9 offers particular advantage in an application where the shaft 68 rotates at angular velocities generating extremely high centrifugal fields. In this case, the split ring 64, which is loaded against the radial seat 66 can be made very small and light weight to reduce its centrifugal force, thereby reducing the axial drag force between the seal and the radial seat 66. The solid ring 60, on the other hand, can be made large enough to provide adequate axial pressure servoforces even if the pressure drop across the seal is very low. The objects of centering the seal ring 60 and thereby eliminating heavy wear loads on the faces thereof while permitting relative axial movement of the two shafts is thus accomplished.

Referring now to FIGS. 10 and 11, another alternative embodiment of the present seal is shown for use in applications in which the outer radial seat is non-rotating, in which case no centrifugal force is available to seat the seal rings. To overcome this situation and provide assured closure between the seal ring and the radial seat, a seal ring 72 is provided with an axially extending lip 74, which extends from the high pressure face thereof. The high pressure exerts a sufficient force on the lip 74 to assure closure between the seal ring 70 and a radial seat 76. The axial servoforces needed to center the seal ring 72 would be provided in a manner identical to that described above with reference to FIGS. 3 through 6. For this reason, the seal ring 72 is provided with the circumferential grooves 48 and with the orifices 52 which connect the groove 48 to the high pressure side of the seal.

The relative advantages of the herein disclosed seals should be obvious from the above description. Some of the more significant advantages are: a significant decrease in wear rate, decrease in rubbing heat generation, and a decrease in leakage rates, and an increase in seal life when compared to all presently used ring seals. In addition, significant cost, weight and size reductions are possible when compared to the more complicated sealing arrangements presently needed in sophisticated machinery such as gas turbine engines.

While the above description was limited to carbon piston ring type seals, it should be obvious to one skilled in the art that the present seal could be made of any material, including metal, if temperature limitations or other considerations prevent the use of carbon. The seal would have potential applicability in any situation in which a pressure differential occurs across the seal. As described above, the seal can be used between two rotating components or between a rotating and a stationary component. The seal can replace presently used carbon piston ring type seals, carbon circumferential seals, labyrinth teeth type seals, etc.

It should also be obvious to one skilled in the art that many changes could be made in the above described embodiments without departing from the broad inventive concept thereof. For example, the circumferential grooves 48 in the low pressure face of the seal rings could be eliminated and the orifices 52 replaced with larger passages. With this design, the curtain area around the discharge of each passage controls the air flow by virtue of the clearance between the seal ring and the seal axial seat when the clearance is small. The size of the passage itself controls the flow when the curtain area is large. In addition, hydrodynamic bearings may be built into one or both of the faces of the seal ring to provide an interface force due to the shear effect on the air (or liquid) from shaft rotation. The hydrodynamic bearings could be used in conjunction with the hydrostatic servoforce generating means to provide an especially advantageous design when ambient pressure levels vary and are at times inadequate to support the seal ring faces due to hydrostatic forces alone. Finally, the above designs, or slight variations thereof, could be used not only for rotating applications but also for reciprocating or reciprocating-rotating applications. Power consumption and wear would be reduced, for example, if the seal were incorporated into a piston ring because the piston ring could be designed such that the radial outward force decreases as pressure increases. Thus, the corresponding axial force to produce sliding would also decrease. It is intended, therefore, that the appended claims cover these and all similar changes.

What I claim is:

1. In a dynamic shaft seal assembly for an apparatus having at least one rotating component, said seal assembly including a sealing ring subjected to a relatively high pressure on one side thereof and a lower pressure on its opposite side, a radial seat for supporting said sealing ring in a radial direction, and a groove for receiving said sealing ring, said groove forming a first axial seat on one side of said ring and a second axial seat on the opposite side of said ring, the improvement of which comprises:

said sealing ring including means for generating a servoforce on a first face of said ring spaced by a gap from said first axial seat, said servoforce generating means including passage means for fluidically connecting said first face of said ring to the high pressure side of said sealing ring, said passage means being sized so as to operate as the primary restriction in the flow path from the high pressure side to the low pressure side when said gap is a first size and as a minimal restriction in the flow path when said gap is a second size, the change from the primary to the minimal restriction acting to vary said servoforce whereby said ring tends to be centered in said groove and rubbing forces between said face and said axial seat are substantially eliminated.

2. The improved seal assembly recited in claim 1 further including means for preventing flow between said sealing ring and said radial seat.

3. The improved seal assembly recited in claim 2 further characterized in that said servo force generating means include one or more circumferential grooves located in said first face of said sealing ring, and said servoforce generating means further includes means for fluidically connecting said grooves to the high pressure side of said sealing ring, said means for fluidically connecting said grooves to the high pressure side comprising at least one orifice extending through said ring, said orifice being sized so as to operate as the primary restriction in the flow path from the high pressure side to the low pressure side when said gap is a first size and as a minimal restriction in the flow path when said gap is a second size.

4. The improved seal assembly recited in claim 3 where said second face of said sealing ring cooperates with said second axial seat to form a generally radial flow passage which determines the approximate leakage rate for said seal assembly.

5. The improved seal assembly recited in claim 4 further including means for venting that portion of said groove which lies beneath said sealing ring to a pressure lower than that of the high pressure side of said sealing ring.

6. The improved seal assembly recited in claim 5 wherein said flow preventing means comprise a pressure dam integrally formed with, and extending in a generally radial direction from, said sealing ring.

7. The improved seal assembly recited in claim 6 wherein said pressure dam is located near the low pressure side of said sealing ring.

8. The improved seal assembly recited in claim 7 wherein said sealing ring comprises a split ring.

9. The improved seal assembly recited in claim 8 further including means for generating a radial pressure force on said sealing ring.

10. The improved seal assembly recited in claim 9 wherein said radial pressure force generating means comprise a circumferential groove positioned in the outer face of said sealing ring and passageway means for connecting said circumferential groove to the high pressure side of said sealing ring.

11. The improved seal assembly recited in claim 6 wherein said pressure dam is located near the high pressure side of said sealing ring and said sealing ring includes an axial extension on its high pressure side whereby high pressure air exerts a force radially outward on said extension.

12. The improved seal assembly recited in claim 5 wherein said sealing ring comprises a solid ring, said solid ring having a circumferential groove in its outer surface, and said flow preventing means comprise a split ring positioned within said circumferential groove in said solid ring.

13. A dynamic shaft seal assembly for an apparatus having at least one rotating component, said assembly including a solid sealing ring subject to a high pressure on one side thereof and a lower pressure on the opposite side thereof, a radial seat for supporting said solid sealing ring in a radial direction, means forming a circumferential groove for receiving said solid sealing ring, said groove forming a first axial seat on one side of said ring and a second axial seat on the opposite side of said ring, said solid ring including a groove in the outer face thereof, a split sealing ring positioned within said groove of said solid ring, and said solid sealing ring including means for generating a servoforce on a face thereof spaced from said first axial seat, said servoforce generating means including passage means for fluidically connecting said sealing ring to the high pressure side of said sealing ring, said passage means being sized so as to operate as the primary restriction in the flow path from the high pressure side to the low pressure side when said gap is a first size and as a minimal restriction in the flow path when said gap is a second size, the change from the primary to the minimal restriction acting to vary said servoforce whereby said solid ring tends to be centered in said circumferential groove and rubbing forces between said face and said first axial seat are substantially eliminated while said split sealing ring prevents flow between said ring and said radial seat.

14. The seal assembly recited in claim 13 further characterized in that said first face of said solid sealing ring includes one or more circumferential grooves and said passage means fluidically connect said grooves to the high pressure side of said ring.

15. The seal assembly recited in claim 14 wherein said second face of said solid sealing ring cooperates with said second axial seat to form a generally radial flow passage which determines the approximate leakage rate for said seal assembly.

16. The seal assembly recited in claim 15 further including means for venting that portion of said groove which lies beneath said solid sealing ring to a pressure lower than that of the high pressure side of said solid sealing ring.

17. A dynamic shaft seal assembly for an apparatus having one or more rotating components, said seal assembly including a sealing ring subjected to a relatively high pressure on one side thereof and a lower pressure on its opposite side, a radial seat for supporting said sealing ring in a radial direction, and a groove for receiving said sealing ring, said groove forming a first axial seat on one side of said ring and a second axial seat on the opposite side of said ring, said ring including a plurality of orifices, each having an inlet located in fluid flow communication with a first face of said ring spaced from said first axial seat and an outlet located in a second face of said ring spaced from said second axial seat, said second face including at least one circumferential groove therein which lies in fluid flow relationship with said outlet of at least one of said orifices, said orifices being sized with respect to a gap between said second face of said ring and said second axial seat such that a pressure drop occurs between said inlets and said outlets of said orifices when said gap is at a first relatively large dimension and substantially equal pressures exist at said inlets and outlets when said gap decreases to a relatively small dimension.

* * * * *